US011962114B2

(12) United States Patent
Ivancic et al.

(10) Patent No.: US 11,962,114 B2
(45) Date of Patent: Apr. 16, 2024

(54) HEAT DISSIPATING CONNECTORS

(71) Applicant: PPC BROADBAND, INC., East Syracuse, NY (US)

(72) Inventors: Joshua C. Ivancic, Clinton, NY (US); Noah P. Montena, Syracuse, NY (US); Daniel Daoust, Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 17/568,696

(22) Filed: Jan. 4, 2022

(65) Prior Publication Data

US 2022/0209476 A1 Jun. 30, 2022

Related U.S. Application Data

(60) Provisional application No. 63/133,229, filed on Dec. 31, 2020.

(51) Int. Cl.
*H01R 24/40* (2011.01)
*H01R 103/00* (2006.01)

(52) U.S. Cl.
CPC ......... *H01R 24/40* (2013.01); *H01R 2103/00* (2013.01)

(58) Field of Classification Search
CPC ............................ H01R 24/40; H01R 2103/00
See application file for complete search history.

(56) References Cited

U.S. PATENT DOCUMENTS

| | | | | |
|---|---|---|---|---|
| 7,972,176 | B2 * | 7/2011 | Burris | H01R 9/0521 439/584 |
| 9,282,680 | B2 * | 3/2016 | Murphy | H01R 13/502 |
| 10,627,587 | B2 * | 4/2020 | Wan | G02B 6/4269 |

* cited by examiner

*Primary Examiner* — Briggitte R. Hammond
(74) *Attorney, Agent, or Firm* — MH2 TECHNOLOGY LAW GROUP LLP

(57) ABSTRACT

A heat dissipating hardline connector includes a first body portion configured to support a terminal pin assembly and a second body portion configured to be coupled with the first body portion. The second body portion is configured to receive a hardline cable. The second body portion includes a plurality of spaced apart annular grooves formed in an outer surface of the second body portion to define a plurality of fin portions that are spaced apart from one another along a length of the second body portion. The annular grooves and fin portions are configured to increase the surface area of the outer surface of the second body portion to provide increased heat dissipation by the second body portion.

21 Claims, 6 Drawing Sheets

HEAT DISSIPATING CONNECTORS

CROSS-REFERENCE TO RELATED APPLICATIONS

This application claims the benefit of U.S. Provisional Application No. 63/133,229 filed on Dec. 31, 2020, the disclosure of which is hereby incorporated by reference in its entirety.

BACKGROUND

The present invention relates generally to connectors for dissipating heat within a node pedestal. More particularly, the disclosure is directed to heat dissipating hardline connectors and heat dissipating jumpers.

Coaxial cables are commonly used in the cable television industry to carry cable TV signals to television sets in homes, businesses, and other locations. A hardline coaxial cable may be used to carry the signals in distribution systems exterior to these locations and a flexible coaxial cable is then often used to carry the signals within the interior of these locations. Hardline or semi-rigid coaxial cable is also used where a high degree of radio-frequency (RF) shielding is required.

Hardline cable is often terminated and connected to a node within a node pedestal. The node within the pedestal generates large amounts of heat. In some situations, the large amounts of heat may cause the node pedestal to melt. Further, excessive heat is a significant factor in failures within electronic components, including nodes within a node pedestal.

It may be desirable to provide a connector that can passively remove heat from an electronic component such as, for example, a node pedestal. It may also be desirable to provide a simple, efficient, and cost effective connector than can passively remove heat from such an electronic component.

SUMMARY

In accordance with various aspects of the present disclosure, a heat dissipating hardline connector includes a first body portion configured to support a terminal pin assembly and a second body portion configured to receive a prepared end of a hardline coaxial cable. The terminal pin assembly is configured to extend from a first end of the first body portion, the first end of the first body portion is configured to be threadedly coupled with an interface port, and a first end of the second body portion is configured to be coupled with a second end of the first body portion. The second body portion includes a plurality of spaced apart annular grooves formed in an outer surface of the second body portion and configured to define a plurality of fin portions that are spaced apart from one another along a length of the second body portion. The plurality of fin portions are configured to define a hexagonal outer profile when viewed from the first end or a second end of the second body portion in the longitudinal direction. The plurality of fin portions are configured to be gripped with a hex-gripping tool. The plurality of annular grooves and fin portions are configured to have a surface area that is at least 50% greater than a virtual surface area of the hexagonal outer profile extended along the length of the second body portion. The plurality of annular grooves and fin portions are configured to provide increased heat dissipation by the second body portion. The fin portions and the annular grooves are configured such that the fin portions have a strength configured to avoid being deformed when the second body portion is tightened to the first body portion to a predetermined torque by a tightening tool.

In some aspects, the surface area of the plurality of annular grooves and fin portions is configured to be about 75% greater than the virtual surface area of the hexagonal outer profile extended along the length of the second body portion.

According to various aspects, the connector further includes an end cap configured to be coupled with the second end of the second body portion.

In accordance with various aspect of the disclosure, a heat dissipating hardline connector includes a first body portion configured to support a terminal pin assembly and a second body portion configured to receive a prepared end of a hardline coaxial cable. The terminal pin assembly is configured to extend from a first end of the first body portion, the first end of the first body portion is configured to be threadedly coupled with an interface port, and a first end of the second body portion is configured to be coupled with a second end of the first body portion. The second body portion includes a plurality of spaced apart annular grooves formed in an outer surface of the second body portion and configured to define a plurality of fin portions that are spaced apart from one another along a length of the second body portion. The plurality of annular grooves and fin portions are configured to increase the surface area of the outer surface of the second body portion by at least 50% to provide increased heat dissipation by the second body portion.

In some aspects, the plurality of annular grooves and fin portions are configured to increase the surface area of the outer surface of the second body portion by about 75% to provide increased heat dissipation by the second body portion. According to various aspects, the plurality of annular grooves and fin portions are configured to have a surface area that is about 75% greater than a virtual surface area of the hexagonal outer profile extended along the length of the second body portion.

In various aspects, the plurality of annular grooves and fin portions are configured to have a surface area that is at least 50% greater than a virtual surface area of the hexagonal outer profile extended along the length of the second body portion.

According to some aspects, the plurality of fin portions are configured to define a hexagonal outer profile when viewed from the first end or the second end of the second body portion in the longitudinal direction. In various aspects, the plurality of fin portions are configured to be gripped with a hex-gripping tool.

According to various aspects, the connector further includes an end cap configured to be coupled with the second end of the second body portion.

In some aspects, the fin portions and the annular grooves are configured such that the fin portions have a strength configured to avoid being deformed when the second body portion is tightened to the first body portion to a predetermined torque by a tightening tool.

According to some embodiments, heat dissipating hardline connector includes a first body portion configured to support a terminal pin assembly and a second body portion configured to be coupled with the first body portion. The second body portion is configured to receive a hardline cable. The second body portion includes a plurality of spaced apart annular grooves formed in an outer surface of the second body portion to define a plurality of fin portions that are spaced apart from one another along a length of the second body portion. The annular grooves and fin portions are configured to increase the surface area of the outer surface of the second body portion to provide increased heat dissipation by the second body portion.

In some aspects, the plurality of annular grooves and fin portions are configured to increase the surface area of the outer surface of the second body portion by at least 50% to provide increased heat dissipation by the second body portion. According to various aspects, the plurality of annular grooves and fin portions are configured to have a surface area that is at least 50% greater than a virtual surface area of the hexagonal outer profile extended along the length of the second body portion.

In various aspects, the plurality of annular grooves and fin portions are configured to increase the surface area of the outer surface of the second body portion by about 75% to provide increased heat dissipation by the second body portion. According to some aspects, the plurality of annular grooves and fin portions are configured to have a surface area that is about 75% greater than a virtual surface area of the hexagonal outer profile extended along the length of the second body portion.

According to various aspects, the plurality of fin portions are configured to define a hexagonal outer profile when viewed from the first end or the second end of the second body portion in the longitudinal direction. In some aspects, the plurality of fin portions are configured to be gripped with a hex-gripping tool.

According to some aspects, the connector further includes an end cap configured to be coupled with the second end of the second body portion.

In various aspects, the terminal pin assembly is configured to extend from a first end of the first body portion, the first end of the first body portion is configured to be threadedly coupled with an interface port, and a first end of the second body portion is configured to be coupled with a second end of the first body portion.

In some aspects, the fin portions and the annular grooves are configured such that the fin portions have a strength configured to avoid being deformed when the second body portion is tightened to the first body portion to a predetermined torque by a tightening tool.

Various aspects of heat dissipating connectors, as well as other embodiments, objects, features and advantages of this disclosure, will be apparent from the following detailed description of illustrative embodiments thereof, which is to be read in conjunction with the accompanying drawings.

DETAILED DESCRIPTION OF EMBODIMENTS

Figure 1:
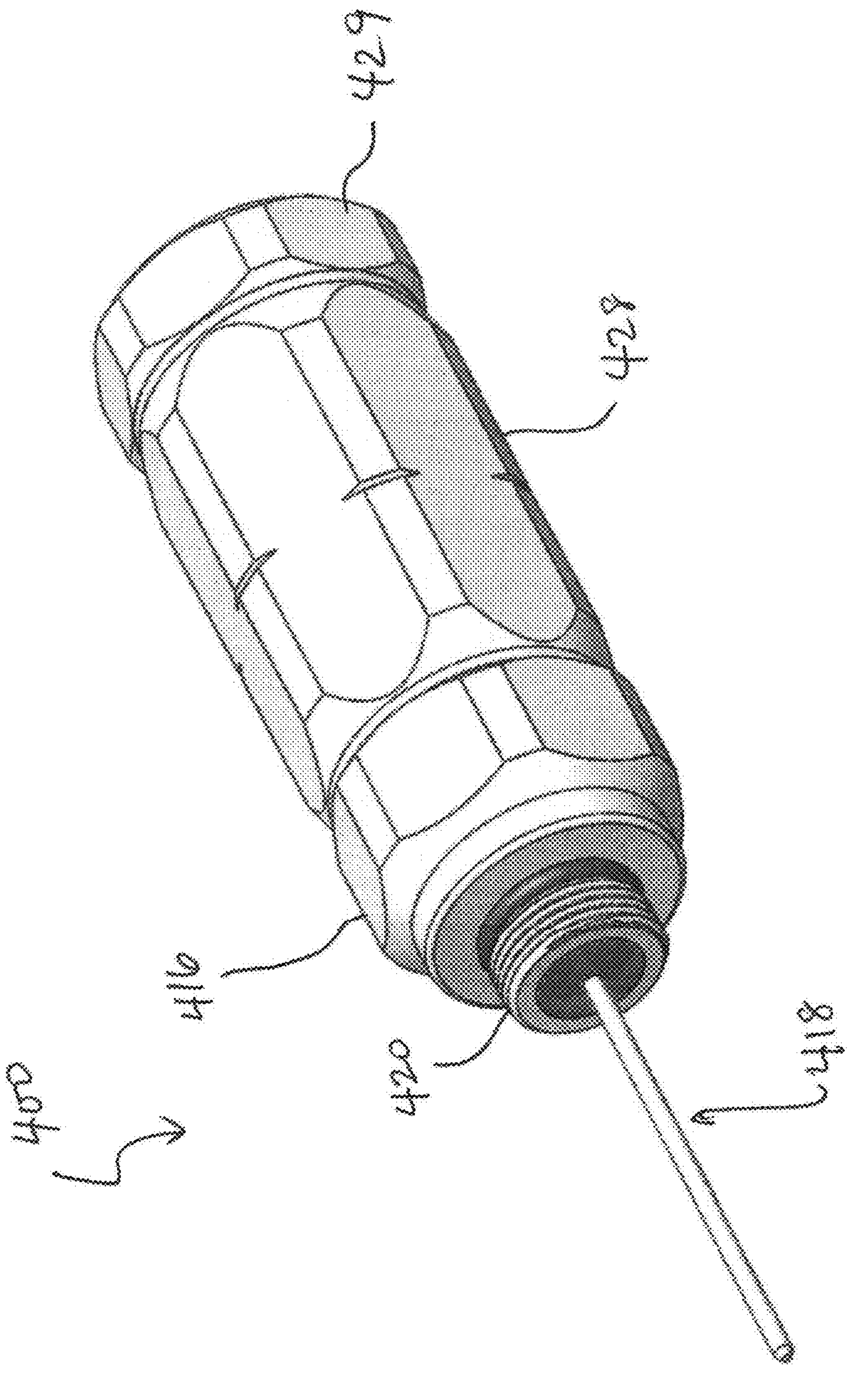
FIG. 1 is a perspective view of an exemplary hardline connector.
Figure 2:
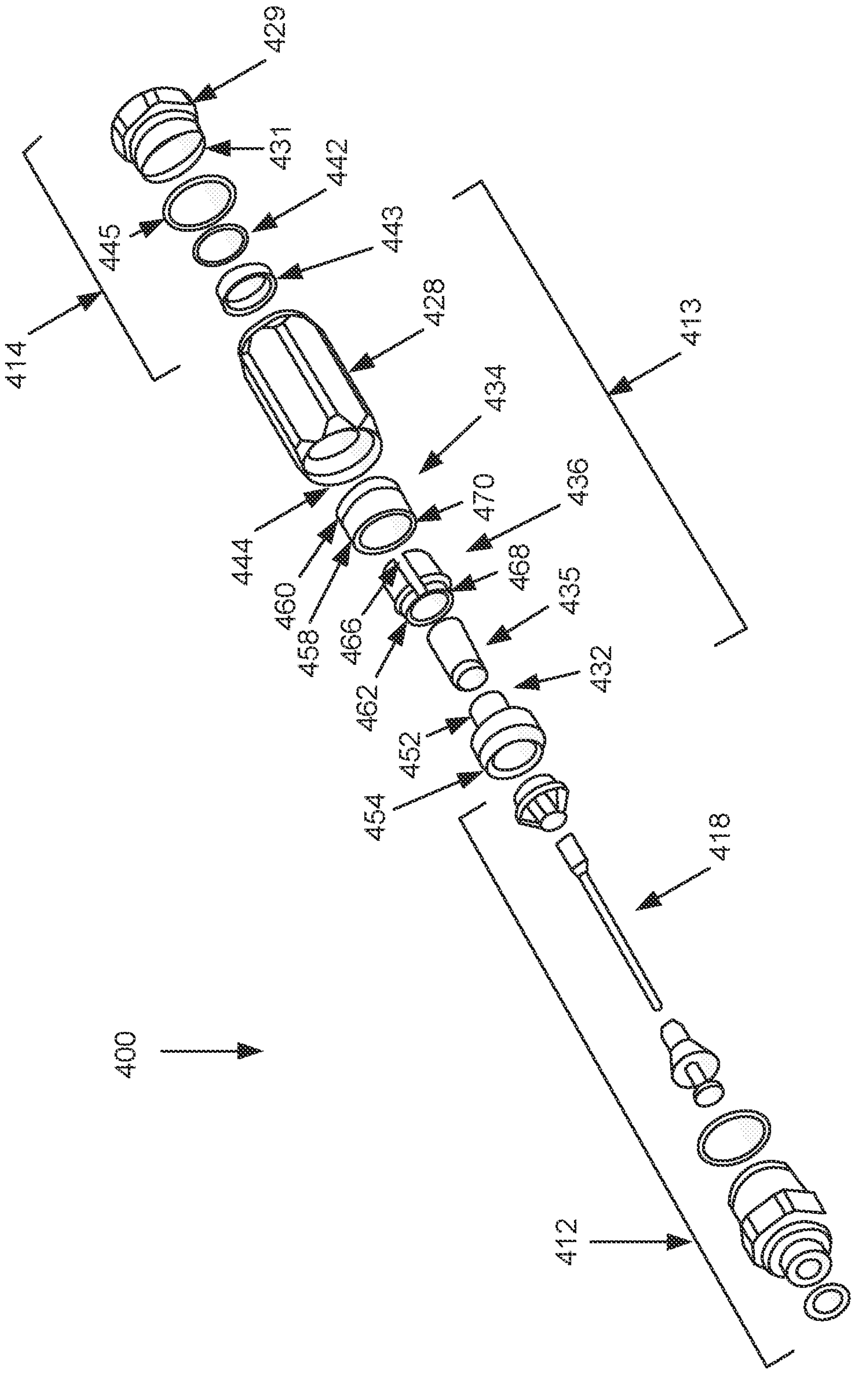
FIG. 2 is an exploded perspective view of the hardline connector of FIG. 1.
Figure 3:
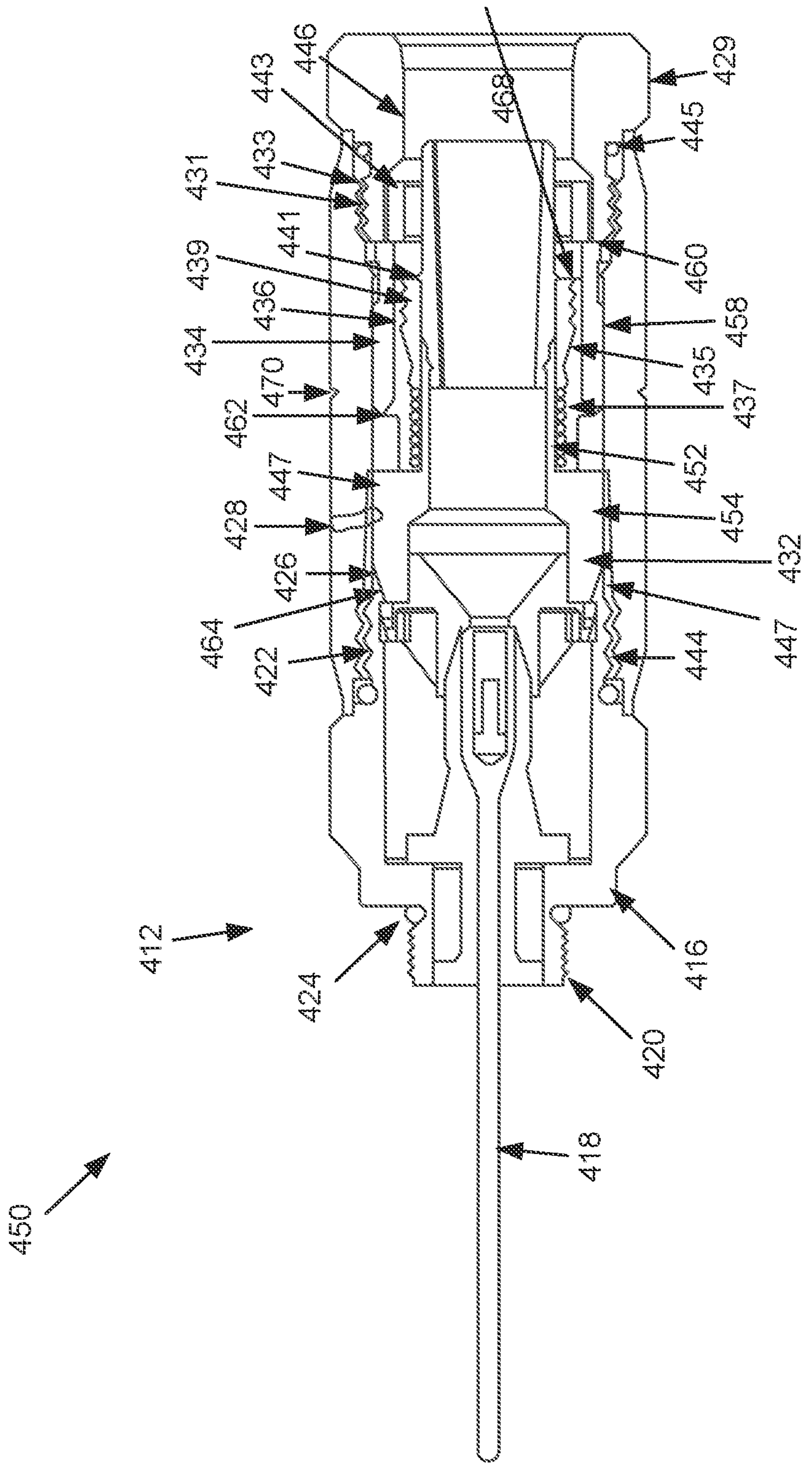
FIG. 3 is a side cross-sectional view of the hardline connector of FIG. 2.

Referring first to FIGS. 1-3, an exemplary hardline connector 400 is illustrated. The connector 400 includes a front nut assembly 412, a mid nut assembly 413, and a back nut assembly 414 that are configured to be removably connected to one another while providing both an electrical and mechanical connection therebetween. Although not illustrated, the connector 400 is configured such that a coaxial cable (not shown) can be inserted into the rearward end of the back nut assembly 414 of the connector 400.

The connector 400 includes a plurality of components generally having a coaxial configuration about an axis defined by the center conductor of the coaxial cable. The front nut assembly 412 includes an entry body housing 416 supporting a terminal pin assembly 418 therein. Specifically, the entry body housing 416 is formed with an axial bore configured to cooperatively contain the terminal pin assembly 418 and is made from an electrically conductive material such as aluminum, brass, or the like. The entry body housing 416 is formed with a threaded portion 420 at its forward end and a rearward threaded portion 422 opposite the forward threaded portion. The forward threaded portion 420 is configured to cooperate with devices located in the field that receive the forward end of the pin assembly 418. An O-ring 424 may be provided around the forward threaded portion 420 to improve the seal that is made with a device and a portion of the exterior perimeter of the entry body housing 416 may be provided with a hexagonal shape to accommodate the use of tools during installation.

The rearward threaded portion 422 of the front nut assembly 412 is configured to cooperate with the mid nut assembly 413. Specifically, the rearward threaded portion 422 includes a rim face 426 that cooperates with an insert shaft 432 of the mid nut assembly 413, as will be described in further detail below.

The mid nut assembly 413 of the connector 400 includes a mid nut housing 428 having an axial bore and a compression subassembly 430 rotatably supported within the axial bore. The compression subassembly 430 generally includes the insert shaft 432, a holder sleeve 434, a support sleeve 435, and a cable gripping ferrule 436.

The back nut assembly 414 of the connector 400 includes an end cap 429, an insert sleeve 443, a first O-ring 442, and a second O-ring 445 arranged in a coaxial relationship about the central axis of the mid nut housing 428. The first O-ring 442 improves the seal between the end cap 429 and the cable upon assembly, and the second O-ring 445 improves the seal between the end cap 429 and the mid nut housing 428.

The mid nut housing 428 is made from an electrically conductive material, such as aluminum, brass, or the like, and includes a forward internally threaded portion 444 that cooperates with the rearward threaded portion 422 of the entry body housing 416 so that the two connector portions may be threadedly coupled together. Similarly, the end cap 429 may be made from an electrically conductive material, such as aluminum, brass, or the like, and includes a forward internally threaded portion 431 that cooperates with a rearward threaded portion 433 of the mid nut housing 428 so that the two connector portions may be threadedly coupled together. The exterior surface of the mid nut housing 428 and/or the end cap 429 are preferably provided with a hexagonal shape to accommodate the use of tools to facilitate such threaded coupling.

The end cap 429 and the insert sleeve 443 are formed with an axial bore 446 dimensioned to receive the outside diameter of the cable in snug fitting relationship. At a forward end of the mid nut housing 428, opposite the end cap 429, the mid nut housing 428 is formed with a forward axial bore 447 communicating with the rearward axial bore 446 and dimensioned to accommodate the outer diameter of the insert shaft 432. The end cap 429 is preferably formed with an internal annular shoulder 448 that prevents rearward movement of the holder sleeve 434, and thus the gripping ferrule 436, as the gripping ferrule is radially compressed, as will be discussed in further detail below.

The insert shaft 432 includes a tubular body 452 terminating at a forward flanged head portion 454. The insert shaft 432 is made from metal. The outside diameter of the tubular body 452 of the insert shaft 432 is dimensioned to be fitted within the inner diameter of the outer conductor of the coaxial cable. Also, the inside diameter of the tubular body 452 is dimensioned to provide a passageway to receive the center conductor of the cable after the cable has been prepared for termination, wherein a length of the dielectric has been removed from the forward end of the cable.

The support sleeve 435 is a tubular body made from plastic. The outside diameter of the tubular body of the support sleeve 435 is dimensioned to be fitted within the inner diameter of the outer conductor of the coaxial cable. Also, the inside diameter of the tubular body of the support sleeve 435 is dimensioned to provide a passageway to receive the center conductor of the cable after the cable has been prepared for termination, wherein a length of the dielectric has been removed from the forward end of the cable. In some aspects, the inside diameter of the tubular body of the support sleeve 435 may taper from the rear end toward the forward end, as shown in FIG. 3.

A forward region of the support sleeve 435 includes a retention structure 437 configured to receive a complementary retention structure 439 at a rearward region of the insert shaft 432. For example, as illustrated, the retention structure 437 may be an annular groove, and the retention structure 439 may be an annular projection. The retention structures 437, 439 cooperate to limit or prevent relative axial movement between the insert shaft 432 and the support sleeve 435. The support sleeve 435 may also include a forward facing annular shoulder 441 that can engage a rearward edge 453 of the insert shaft 432. The plastic support sleeve 435 may have a thicker radial wall than the metal insert shaft 432. The metal insert shaft 432 has an axial length that extends into the gripping ferrule 436, but does not extend to the rearward axial bore 446. The plastic support sleeve 435 has an axial length that extends from the metal insert shaft 432 within the gripping ferrule 436 to the rearward axial bore 446.

The holder sleeve 434 is preferably made from an electrically conductive material, such as aluminum or brass, and includes a sleeve body 458 having an exterior surface configured to be received within the forward axial bore 447 of the mid nut housing 428. The sleeve body 458 terminates at a rearward edge 460, which engages the annular shoulder 448 of the end cap 429 and a forward end of the insert sleeve 443.

The cable gripping ferrule 436 is generally in the form of a split tube having an axial gap 466 extending the full length of the ferrule. The gap 466 permits the diameter of the ferrule 436 to be reduced more easily so that the ferrule can be uniformly, radially compressed around the insert shaft 432 and the support sleeve 435 upon rearward axial movement of the insert shaft 432. The inner surface 468 of the gripping ferrule is preferably provided with structure to enhance gripping of the outer surface of the cable. Such structure may include internal threads, teeth or some other form of textured surface.

As mentioned above, the outer surface of the cable gripping ferrule 436 is provided with a circumferential ramped portion 462, which engages a forward end 470 of the holder sleeve 434, opposite the rearward edge 460, upon forward axial movement of the holder sleeve 434 to radially compress the gripping ferrule 436. The ramped portion 462 defines a conical segment of the cable gripping ferrule 436 that tapers radially inwardly in the rearward direction. A rearward portion of the gripping ferrule 436 is received in an axial bore of the holder sleeve 434.

Operation and installation of the connector 400 will now be described. Initially, the end of a coaxial cable that is to be inserted into the rearward end of the mid nut housing 428 is prepared in a conventional manner. In particular, cable preparation entails removing about 0.75 inch (19.05 mm.) of cable dielectric, outer cable conductor, and cable jacket to expose a portion of the center conductor that will engage the pin-terminal assembly 418 of the front nut assembly 412. In addition, about 1.25 inches (31.75 mm.) of the cable dielectric is removed from within the outer cable conductor to provide clearance for the installation of the insert shaft 432 and the support sleeve 435, and about 0.5 inch (12.70 mm.) of cable jacket is removed to make an electrical connection with the inside surface 468 of the cable gripping ferrule 436. After the cable end is prepared, it is inserted through the end cap 429, second O-ring 445, first O-ring 442, and insert sleeve 443 and into the mid nut housing 428 so that the portion of the center conductor engages the pin-terminal assembly 418.

The mid nut housing 428 is next threadedly coupled and rotated with respect to the entry nut housing 416 to translate the front nut and mid nut assemblies 412, 413 together along their central axes. As the front nut and back nut assemblies 412, 413 are translated closer together, the rim face 426 of the entry nut housing 416 engages a forward rim 464 of the insert shaft 432 to translate the insert shaft 432 and the support sleeve 435 towards the rear of the mid nut housing 428. The interlocking mating surfaces of the front nut and mid nut assemblies 412, 413 cooperate to limit the amount of rotation between the entry nut housing 416 and the mid nut housing 428.

The rearward translation of the insert shaft 432 and support sleeve 435 causes the outer ramp portion 462 of the gripping ferrule 436 to engage the forward end 470 of the holder sleeve 434, resulting in a radial compression of the ferrule 436. The radial compression of the ferrule 436 reduces the overall diameter of the ferrule 436 and reduces the axial gap 466 of the ferrule so that the inner threaded surface 468 of the ferrule 436 bites down on the exposed portion of the outer cable conductor and presses the conductor against the insert shaft 432 and the support sleeve 435.

Figure 4:
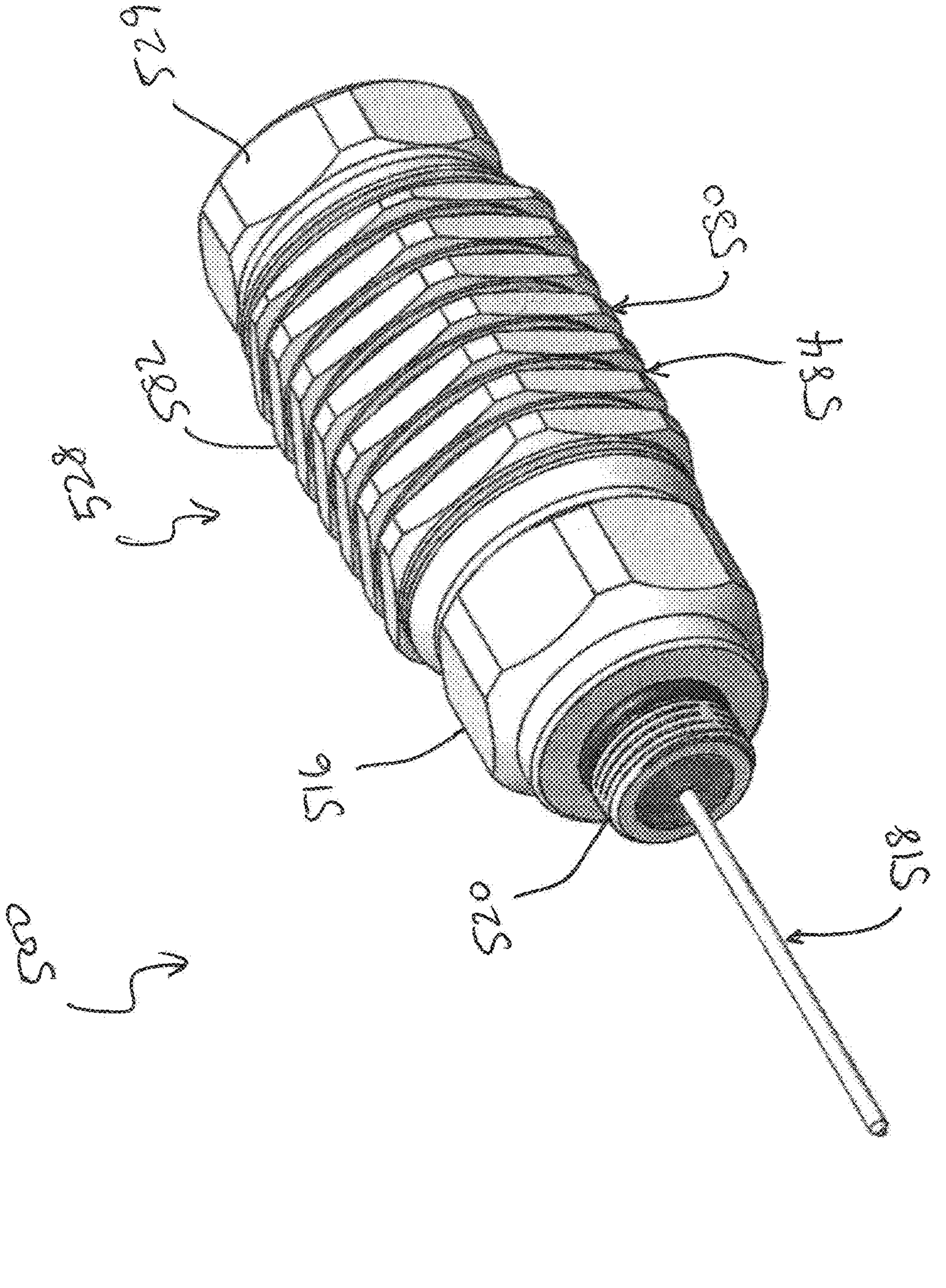
FIG. 4 is a perspective view of an exemplary heat dissipating hardline connector in accordance with various aspects of the disclosure.

Referring now to FIG. 4, an exemplary heat dissipating hardline connector 500 is illustrated. The hardline connector 500 may include a front nut assembly, a mid nut assembly, and a back nut assembly similar to the front nut assembly 412, the mid nut assembly 413, and the back nut assembly 414 described above. For example, the connector 500 includes an entry nut housing 516, a mid nut housing 528, and an end cap 529, as shown in FIG. 4. The entry body housing 516 includes a threaded portion 520 and supports a terminal pin assembly 518 therein.

The mid nut housing 528 includes an outer surface 580 configured to have increased surface area when compared with the mid nut housing 428 illustrated in FIGS. 1-3. For example, the outer surface 580 of the mid nut housing 528 is configured to have hexagonal fin portions 582 that define a hexagonal outer profile when viewed from a front end 502 or a rear end 504 of the connector 500 along a longitudinal axis L of the connector 500. The hexagonal outer profile facilitates the mid nut housing 528 being gripped with a wrench, a spanner, or other hex-gripping tool for tightening to the entry nut housing 516. In addition, the mid nut housing 528 includes a plurality of annular grooves 584 cut into the outer surface 580 to increase the surface area of the outer surface 580 that is exposed to air exterior of the connector 500.

In the three piece hardline connector 500 illustrated in FIG. 4, the plurality of annular grooves 584 are evenly spaced along a length of the outer surface 580 of the mid nut housing 528, and the surface area of the outer surface 580 is increased by about 75% relative to a mid nut housing having an outer surface without such grooves. It should be appreciated that in some aspects, the surface area of the outer surface may be increased by less than 75% or more than 75%. For example, the surface area may be increased by at least 50% in some aspects. According to the basic equation for heat transfer rate (i.e., convection), increased surface area is directly correlated to the amount of heat that is dissipated by convection. The basic equation for heat transfer rate (i.e., convection) is:

$$Q=h\cdot A\cdot \Delta T$$

where

Q=heat transfer rate, h=convention heat-transfer coefficient,

A=exposed surface area, and

ΔT=temperature difference.

Accordingly, the hardline connector 500 described herein and illustrated in FIG. 4 can be configured to increase or maximize heat dissipation, for example, within a node pedestal, as well as to transfer an RF signal. Further, the fin portions 582 and the annular grooves 584 are configured such that the fin portions 582 have sufficient strength to avoid being deformed when the mid nut housing 528 is tightened to the entry body housing 516 to a predetermined torque by a tightening tool. Thus, the configuration of the outer surface 580 of the mid nut housing 528 preserves the ability of the connector 500 to be tightened by a wrench, spanner, or hex-gripping tool while increasing the surface area of the outer surface 580 by machining the annular grooves 584 into the outer surface 580 to define the hex profiled fin portions 582 that improve heat dissipation.

It should be appreciated that in some embodiments, the fin portions 582 may have a shape other than a hexagon, and the outer surface 580 of the mid nut housing 528 may have an outer profile other than a hexagonal shape. For example, the outer profile of the mid nut housing 528 defined by the fin portions 582 may be round, square, octagonal, or any other desired shape.

It should be appreciated that the principles of this disclosure can be applied to other three piece hardline connectors (i.e., with components that differ from those of the hardline connector 400 described above). The principles of this disclosure can also be applied two piece hardline connectors having an entry nut housing and a rear nut housing (but no end cap), wherein the rear nut housing would include the outer surface with fin portions and annular grooves.

Figure 5:
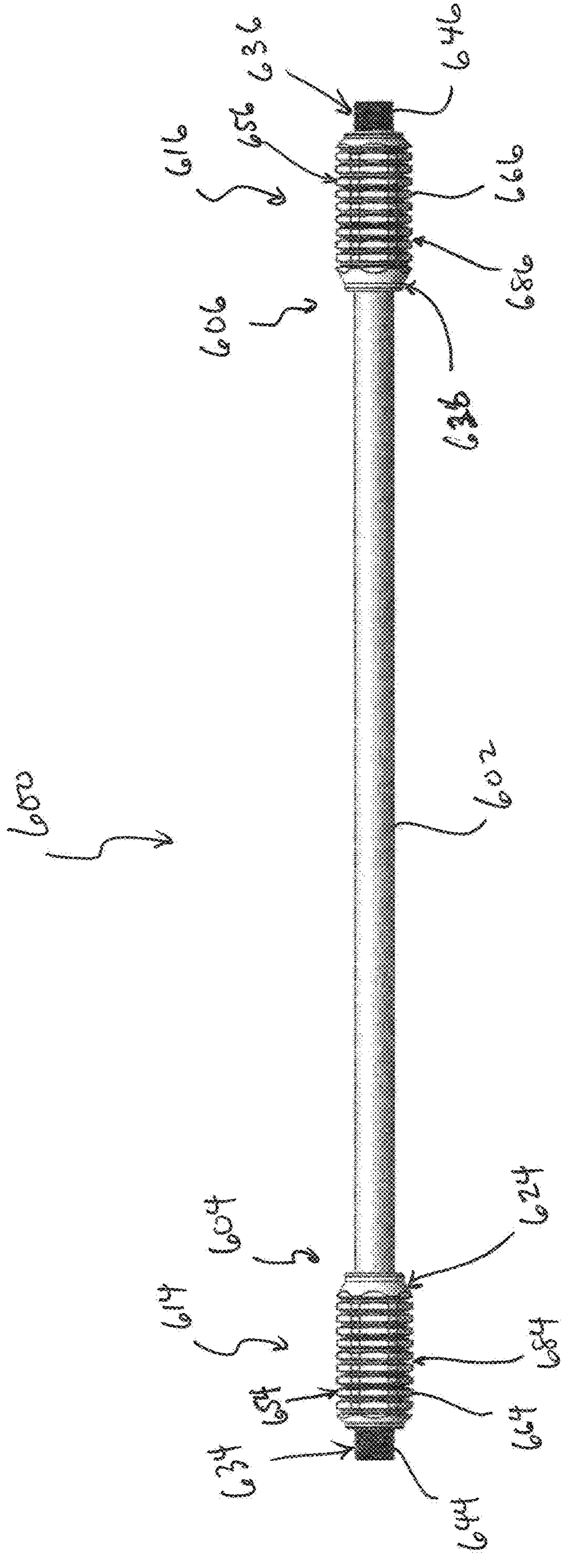
FIG. 5 is a plan view of an exemplary heat dissipating jumper in accordance with various aspects of the disclosure.
Figure 6:
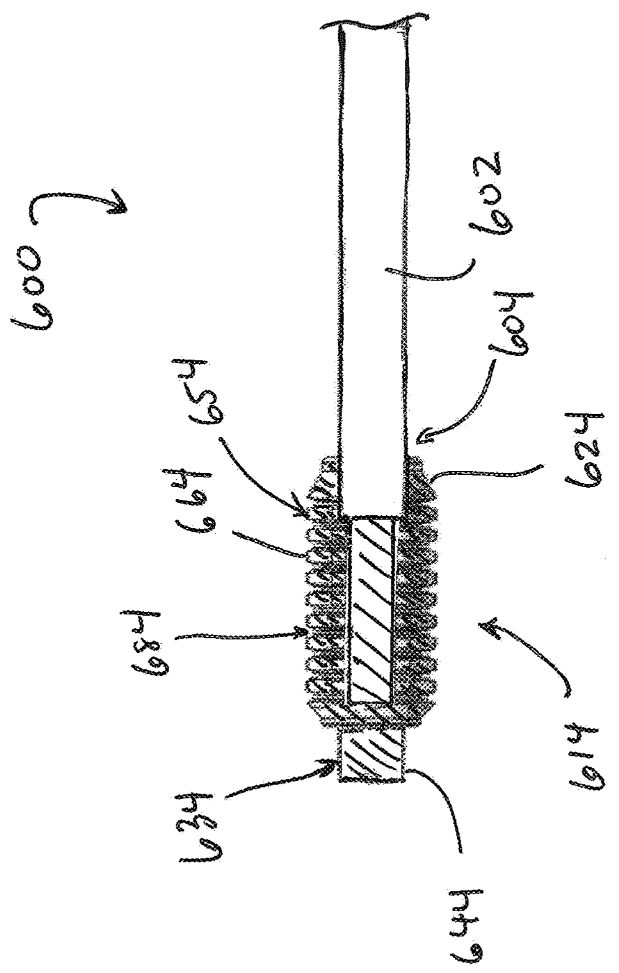
FIG. 6 is a cross-sectional view of a portion of the exemplary heat dissipating jumper of FIG. 5.

Referring now to FIGS. 5 and 6, an exemplary heat dissipating jumper 600 is illustrated. The jumper 600 includes a thermally conductive rod or heat pipe 602 having a first end 604 and a second end 606. For example, as would be understood by persons of ordinary skill in the art, the rod or pipe 202 may be a closed rod or pipe containing a fluid that facilitates heat dissipation. A first heat dissipation connector 614 is pressed on the first end 604 of the thermally conductive rod or heat pipe 602, and a second heat dissipation connector 616 is pressed on the second end 606 of the thermally conductive rod or heat pipe 602.

The first heat dissipation connector 614 includes body portion 624 and a male end portion 634 having external threads 644 (e.g., male KS port threads) configured to be threadedly coupled with a node or heat sink (not shown). The threaded male end portion 634 can have a length that is longer than a threaded end of a standard hardline connector so as to increase the contact surface between the threaded male end portion 634 and the node or heat sink. The body portion 624 includes an outer surface 654 configured to have hexagonal fin portions 664 that define a hexagonal outer profile such that the body portion 624 can be gripped with a wrench, a spanner, or other hex-gripping tool. In addition, the body portion 624 includes a plurality of annular grooves 684 cut into the outer surface 654 to increase the surface area of the outer surface 654 that is exposed to air exterior of the connector 614.

Similarly, the second heat dissipation connector 616 includes body portion 626 and a male end portion 636 having external threads 646 (e.g., male KS port threads) configured to be threadedly coupled with a node or heat sink (not shown). The threaded male end portion 636 can have a length that is longer than a threaded end of a standard hardline connector so as to increase the contact surface between the threaded male end portion 636 and the node or heat sink. The body portion 626 includes an outer surface 656 configured to have hexagonal fin portions 666 that define a hexagonal outer profile such that the body portion 626 can be gripped with a wrench, a spanner, or other hex-gripping tool. In addition, the body portion 626 includes a plurality of annular grooves 686 cut into the outer surface 656 to increase the surface area of the outer surface 656 that is exposed to air exterior of the connector 616.

For example, the outer surface 654, 656 of the connector 614, 616 is configured to have hexagonal fin portions 664, 666 that define a hexagonal outer profile when viewed from a male end portion 634, 636 or from the opposite end along a longitudinal axis L of the connector 614, 616. In some aspects, the plurality of annular grooves 684, 686 are evenly spaced along a length of the outer surface 654, 656, and the surface area of the outer surface 654, 656 is increased by about 75% relative to a connector having an outer surface without such grooves. It should be appreciated that in some aspects, the surface area of the outer surface may be increased by less than 75% or more than 75%. For example, the surface area may be increased by at least 50% in some aspects.

Accordingly, the connector 614, 616 described herein and illustrated in FIGS. 5 and 6 can be configured to increase or maximize heat dissipation, for example, within a node pedestal. Further, the fin portions 664, 666 and the annular grooves 684, 686 are configured such that the fin portions 664, 666 have sufficient strength to avoid being deformed when the connector 614, 616 is tightened to a port to a predetermined torque by a tightening tool. Thus, the configuration of the outer surface 654, 656 preserves the ability of the connector 614, 616 to be tightened by a wrench, spanner, or hex-gripping tool while increasing the surface area of the outer surface 654, 656 by machining the annular grooves 684, 686 into the outer surface 654, 656 to define the hex profiled fin portions 664, 666 that improve heat dissipation.

In use, either the first or second heat dissipation connector 614, 616 of the jumper 600 is threadedly coupled with a node, for example, an unused node within a node pedestal. The other one of the connectors 614, 616 may be threadedly coupled with a heat sink (not shown). As a result, the jumper 600 can conduct heat away from the node to a heat sink.

It should be appreciated that in some embodiments, the fin portions 664, 666 may have a shape other than a hexagon, and the outer surface 654, 656 of the connector 614, 616 may have an outer profile other than a hexagonal shape. For example, the outer profile of the connector 614, 616 defined by the fin portions 664, 666 may be round, square, octagonal, or any other desired shape.

It should be appreciated that thermal paste may be applied to the threaded end portions 634, 636 to improve thermal conductivity.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Various changes to the foregoing described and shown structures will now be evident to those skilled in the art. Accordingly, the particularly disclosed scope of the invention is set forth in the following claims.

What is claimed is:

1. A heat dissipating hardline connector, comprising:

a first body portion configured to support a terminal pin assembly;

a second body portion configured to receive a prepared end of a hardline coaxial cable;

wherein the terminal pin assembly is configured to extend from a first end of the first body portion;

wherein the first end of the first body portion is configured to be threadedly coupled with an interface port;

wherein a first end of the second body portion is configured to be coupled with a second end of the first body portion;

wherein the second body portion includes a plurality of spaced apart annular grooves formed in an outer surface of the second body portion and configured to define a plurality of fin portions that are spaced apart from one another along a length of the second body portion;

wherein the plurality of fin portions are configured to define a hexagonal outer profile when viewed from the first end or a second end of the second body portion in the longitudinal direction;

wherein the plurality of fin portions are configured to be gripped with a hex-gripping tool;

wherein the plurality of annular grooves and fin portions are configured to have a surface area that is at least 50% greater than a virtual surface area of the hexagonal outer profile extended along the length of the second body portion;

wherein the plurality of annular grooves and fin portions are configured to provide increased heat dissipation by the second body portion; and wherein the fin portions and the annular grooves are configured such that the fin portions have a strength configured to avoid being deformed when the second body portion is tightened to the first body portion to a predetermined torque by a tightening tool.

2. The heat dissipating hardline connector of claim 1, wherein the surface area of the plurality of annular grooves and fin portions is configured to be about 75% greater than the virtual surface area of the hexagonal outer profile extended along the length of the second body portion.

3. The heat dissipating hardline connector of claim 1, further comprising an end cap configured to be coupled with the second end of the second body portion.

4. A heat dissipating hardline connector, comprising:

a first body portion configured to support a terminal pin assembly;

a second body portion configured to receive a prepared end of a hardline coaxial cable;

wherein the terminal pin assembly is configured to extend from a first end of the first body portion;

wherein the first end of the first body portion is configured to be threadedly coupled with an interface port;

wherein a first end of the second body portion is configured to be coupled with a second end of the first body portion;

wherein the second body portion includes a plurality of spaced apart annular grooves formed in an outer surface of the second body portion and configured to define a plurality of fin portions that are spaced apart from one another along a length of the second body portion;

wherein each fin portion of the plurality of fin portions has a pair of planar surfaces configured to be engaged with a tool to rotate the connector; and wherein the plurality of annular grooves and fin portions are configured to increase the surface area of the outer surface of the second body portion by at least 50%, compared to a virtual surface area of the outer surface of the second body portion, to provide increased heat dissipation by the second body portion.

5. The heat dissipating hardline connector of claim 4, wherein the plurality of annular grooves and fin portions are configured to increase the surface area of the outer surface of the second body portion by about 75% to provide increased heat dissipation by the second body portion.

6. The heat dissipating hardline connector of claim 5, wherein the plurality of annular grooves and fin portions are configured to have a surface area that is about 75% greater than the virtual surface area of the outer surface of the second body portion extended along the length of the second body portion.

7. The heat dissipating hardline connector of claim 4, wherein the plurality of annular grooves and fin portions are configured to have a surface area that is at least 50% greater than the virtual surface area of the outer surface of the second body portion extended along the length of the second body portion.

8. The heat dissipating hardline connector of claim 4, wherein the plurality of fin portions are configured to define a outer profile when viewed from the first end or the second end of the second body portion in a direction parallel to a longitudinal axis of the second body portion.

9. The heat dissipating hardline connector of claim 8, wherein the plurality of fin portions are configured to be gripped with a hex-gripping tool.

10. The heat dissipating hardline connector of claim 4, further comprising an end cap configured to be coupled with the second end of the second body portion.

11. The heat dissipating hardline connector of claim 4, wherein the fin portions and the annular grooves are configured such that the fin portions have a strength configured to avoid being deformed when the second body portion is tightened to the first body portion to a predetermined torque by a tightening tool.

12. A heat dissipating hardline connector, comprising:

a first body portion configured to support a terminal pin assembly;

a second body portion configured to be coupled with the first body portion;

wherein the second body portion is configured to receive a hardline cable;

wherein the second body portion includes a plurality of spaced apart annular grooves formed in an outer surface of the second body portion to define a plurality of fin portions that are spaced apart from one another along a length of the second body portion;

wherein each fin portion of the plurality of fin portions has a pair of planar surfaces configured to be engaged with a tool to rotate the connector; and wherein the annular grooves and fin portions are configured to increase the surface area of the outer surface of the second body portion, compared to a virtual surface area of the outer surface of the second body portion to provide increased heat dissipation by the second body portion.

13. The heat dissipating hardline connector of claim 12, wherein the plurality of annular grooves and fin portions are configured to increase the surface area of the outer surface of the second body portion by at least 50% to provide increased heat dissipation by the second body portion.

14. The heat dissipating hardline connector of claim 13, wherein the plurality of annular grooves and fin portions are configured to have a surface area that is at least 50% greater than a virtual surface area of the outer extended along the length of the second body portion.

15. The heat dissipating hardline connector of claim 12, wherein the plurality of annular grooves and fin portions are configured to increase the surface area of the outer surface of the second body portion by about 75% to provide increased heat dissipation by the second body portion.

16. The heat dissipating hardline connector of claim 15, wherein the plurality of annular grooves and fin portions are configured to have a surface area that is about 75% greater than a virtual surface area of the second body portion extended along the length of the second body portion.

17. The heat dissipating hardline connector of claim 12, wherein the plurality of fin portions are configured to define a hexagonal outer profile when viewed from a first end or a second end of the second body portion in the longitudinal direction.

18. The heat dissipating hardline connector of claim 17, wherein the plurality of fin portions are configured to be gripped with a hex-gripping tool.

19. The heat dissipating hardline connector of claim 12, further comprising an end cap configured to be coupled with the second body portion.

20. The heat dissipating hardline connector of claim 12, wherein the terminal pin assembly is configured to extend from a first end of the first body portion;

wherein the first end of the first body portion is configured to be threadedly coupled with an interface port; and wherein a first end of the second body portion is configured to be coupled with a second end of the first body portion.

21. The heat dissipating hardline connector of claim 12, wherein the fin portions and the annular grooves are configured such that the fin portions have a strength configured to avoid being deformed when the second body portion is tightened to the first body portion to a predetermined torque by a tightening tool.

* * * * *